United States Patent
Giardina et al.

(10) Patent No.: US 9,059,858 B1
(45) Date of Patent: Jun. 16, 2015

(54) USER CHARACTERISTIC BASED DIGITAL SIGNATURE OF DOCUMENTS

(71) Applicant: CA, Inc., Islandia, NY (US)

(72) Inventors: Nathan J. Giardina, San Diego, CA (US); David S. Tyree, Denver, CO (US); Beau Croteau, Bay Shore, NY (US); Robert Hucik, Simi Valley, CA (US)

(73) Assignee: CA, Inc., New York, NY (US)

( * ) Notice: Subject to any disclaimer, the term of this patent is extended or adjusted under 35 U.S.C. 154(b) by 87 days.

(21) Appl. No.: 13/793,866

(22) Filed: Mar. 11, 2013

(51) Int. Cl.
*H04L 9/32* (2006.01)

(52) U.S. Cl.
CPC .................................. *H04L 9/3281* (2013.01)

(58) Field of Classification Search
None
See application file for complete search history.

(56) References Cited

U.S. PATENT DOCUMENTS

| | | | |
|---|---|---|---|
| 7,296,161 B1* | 11/2007 | Wakao et al. | 713/176 |
| 2006/0098900 A1* | 5/2006 | King et al. | 382/305 |
| 2007/0094333 A1* | 4/2007 | Schilling et al. | 709/206 |
| 2007/0256137 A1* | 11/2007 | Tame | 726/26 |
| 2010/0011424 A1* | 1/2010 | Ushiku | 726/5 |
| 2010/0125670 A1* | 5/2010 | Dondeti et al. | 709/229 |
| 2013/0110728 A1* | 5/2013 | Kobres | 705/75 |

* cited by examiner

*Primary Examiner* — David Le

(74) *Attorney, Agent, or Firm* — Myers Bigel Sibley & Sajovec, P.A.

(57) ABSTRACT

Methods and computer program products provide digital signatures for documents. An authentication code relating to a document is received. The authentication code is decoded to identify a unique identifier for the document, an identifier for an authentication server, and a user authentication parameter. A user characteristic that is defined by the user authentication parameter is obtained to serve as a digital signature for the document. A digital signature storage request is communicated to the authentication server using the identifier for the authentication server. The digital signature storage request contains the unique identifier for the document and the user characteristic obtained by the mobile terminal, and indicates that the authentication server is to store the user characteristic with an association to the unique identifier for the document.

10 Claims, 7 Drawing Sheets

USER CHARACTERISTIC BASED DIGITAL SIGNATURE OF DOCUMENTS

BACKGROUND

The present disclosure relates to authentication systems and, more particularly, to digitally signing documents.

Stylized script signatures on paper are not an practical way to associate a person's signature with electronic documents. Instead, a digital representation of a signature can be used to indicate that a person agrees to the contents of a document, or that a person who claims to have written a document is the one who wrote it. Similarly, a digital signature can be validated to provide a recipient a reason to believe that the document was created by a known author/sender so that the person cannot deny sending it (authentication and non-repudiation). Digital signatures are commonly used for software distribution, financial transactions, and in other situations where a traceable association between a person and a document is desired. Digital signatures are also more easily stored with digital documents and sharable across computer networks compared to traditional stylized script signatures provided on paper documents. In some countries, digital signatures have the same legal consequences as stylized script signatures on paper.

BRIEF SUMMARY

One embodiment of the present disclosure is directed to a method by a mobile terminal that provides a digital signature for a document. An authentication code relating to the document is received. The authentication code is decoded to identify a unique identifier for the document, an identifier for an authentication server, and a user authentication parameter. A user characteristic that is defined by the user authentication parameter is obtained to serve as a digital signature for the document. A digital signature storage request is communicated to the authentication server using the identifier for the authentication server. The digital signature storage request contains the unique identifier for the document and the user characteristic obtained by the mobile terminal, and indicates that the authentication server is to store the user characteristic with an association to the unique identifier for the document.

The mobile terminal may receive the authentication code by optically scanning the authentication code from a document or through a near field communication transceiver. The user characteristic may include a digital image of a user, a digital recording of sound from the user, and/or biometric data for the user.

Another embodiment of the present disclosure is directed to a method by an authentication server that manages a digital signature for a document. A digital signature storage request is received from a mobile terminal. The digital signature storage request contains a unique identifier for the document and a user characteristic obtained by the mobile terminal that serves as a digital signature for the document. The user characteristic is stored with an association to the unique identifier for the document.

Other embodiments are directed to related computer program products that provide a digital signature for a document and computer program products that manage a digital signature for a document.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

Some embodiments are directed to providing a digital signature for a document, where the digital signature includes a defined characteristic that has been obtained from the user. For example, the user characteristic can include, but is not limited, to a digital image (e.g., photograph) of a person who has authored or agreed to the content of a document, a digital image of a document that identifies the person (e.g., passport, driver's license, etc.), digital video with audio recording of the person vocalizing a statement regarding the document (e.g., attesting to the person's identity and agreement to terms recited in the document and/or acknowledgment of the person's relationship (e.g. author) to the document), etc, which will serve as a digital signature for the document.

The digital signature may be used for authentication of documents, and may be used alone as a single-factor authentication, or may combination with other authentication techniques to provide multi-factor authentication. The single/multi-factor authentication can be used to reliably confirm the identity of a person who has signed a document. Multi-factor authentication can include, for example, three tiers of information: first tier—something you know; second tier—something you have; and third-tier something you are (e.g., one or more defined characteristics of the user). For example, first factor authentication can include prompting a user to enter a passcode for validation. Second factor authentication can include obtaining a key from a user's mobile terminal (e.g., mobile terminal identifier). Third factor authentication can include obtaining a defined characteristic of the user (digital image, digital video, digital recording, etc.).

Figure 1:
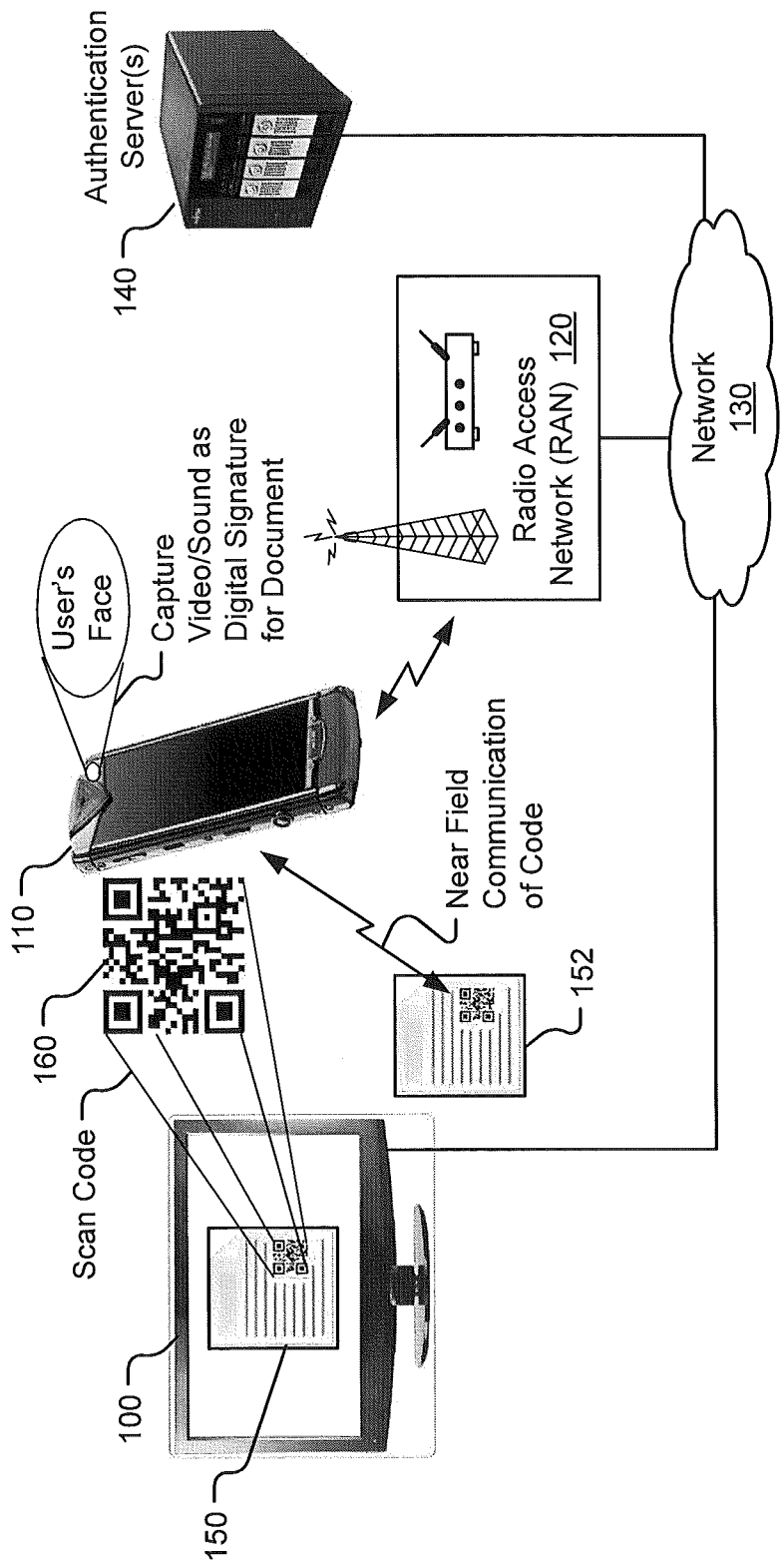
FIG. 1 illustrates a system for providing, managing, and retrieving digital signatures for documents according to some embodiments of the present disclosure.
Figure 2:
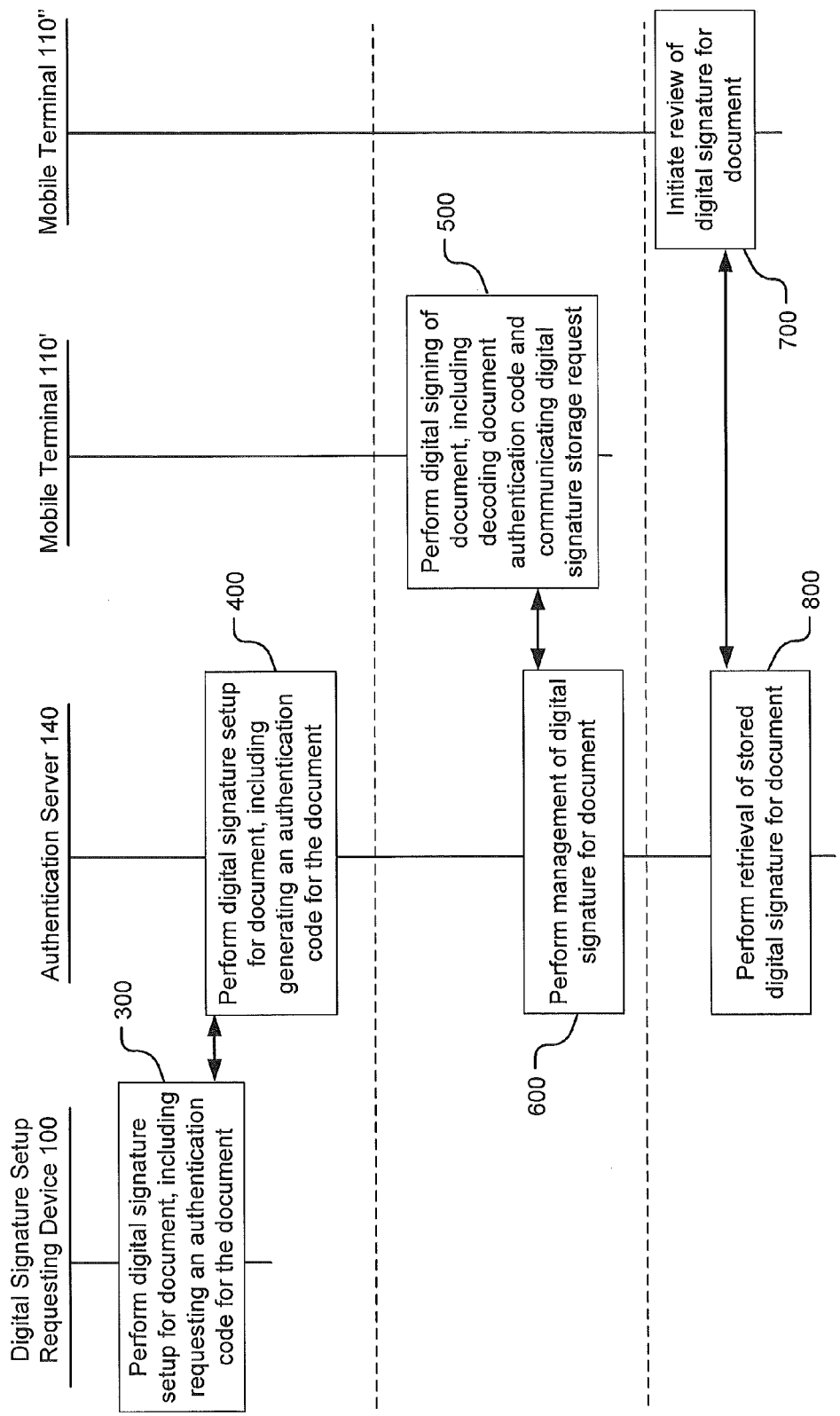
FIG. 2 is a data flow diagram illustrating process relationships in a system for providing, managing, and retrieving digital signatures for documents according to some embodiments of the present disclosure.

FIG. 1 illustrates a system for providing, managing, and retrieving digital signatures for documents in accordance with some embodiments of the present disclosure. FIG. 2 is a data flow diagram illustrating process relationships in a system, such as the system of FIG. 1, for providing, managing, and retrieving digital signatures for documents in accordance with some embodiments of the present disclosure Referring to FIGS. 1 and 2, the system can include a digital signature setup requesting device 100, an authentication server 140, and a mobile terminal 110.

Figure 3:
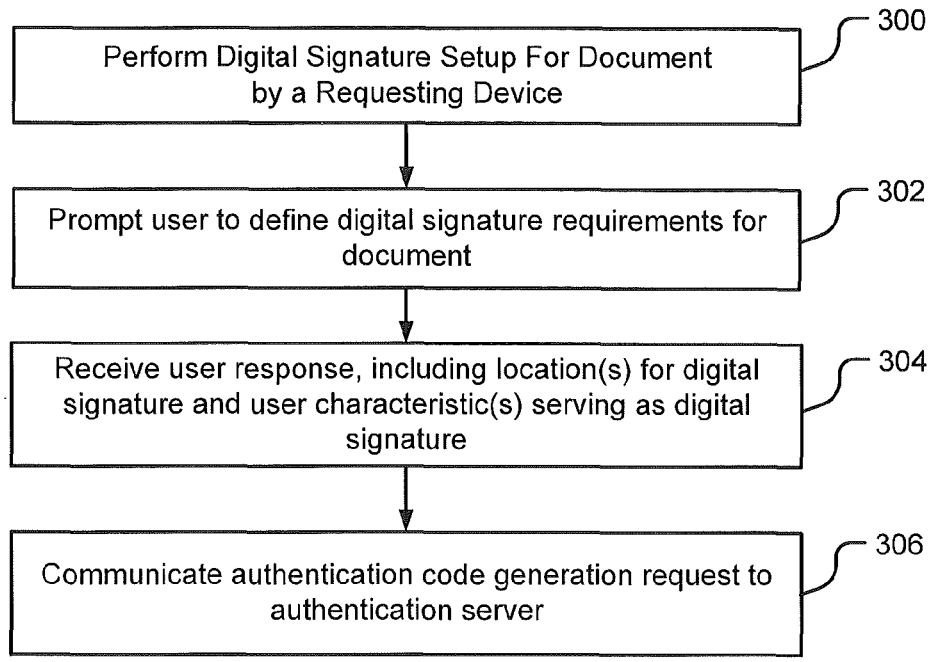
FIG. 3 illustrates example operations by a requesting site for setting up a digital signature for a document according to some embodiments of the present disclosure.

A user can operate the digital signature setup requesting device 100 to setup (block 300 of FIGS. 2,3) a digital signature for a document. The requesting device 100 can prompt (block 302) a user to define digital signature requirements for a document. The requesting device 100 can receive (block 304) a user response that may include identifying a location within the document where a digital signature is to be indicated and identifying the user characteristic(s) that will serve as the digital signature.

The user characteristic can include, but is not limited to, a digital image (e.g., photograph) of a person who has authored or agreed to the content of a document, a digital image of a document that identifies the person (e.g., passport, driver's license, etc.), digital video with audio recording of the person vocalizing a statement regarding the document (e.g., attesting to the person's identity and agreement to terms recited in the document and/or acknowledgment of the person's relationship (e.g. author) to the document), etc, which will serve as a digital signature for the document.

The requesting device 100 may include a web server that hosts a website. The mobile terminal 110 may include a client application (e.g., a document signing and authentication application) and/or a web browser that provides an interface for the user to operate the requesting device 100 to setup a digital signature for the document.

For example, the user may login to an account accessible to the requesting device 100, identify the location where a user link (e.g., signature icon, a QR code, or other digitally represented information) is to be placed within an electronic document, and define that a person can sign the electronic document by providing a digital photograph, digital video, and/or an audio recording for use as at least a portion of the digital signature for the digital document. The user may provide further instructions that are to be communicated to the person signing the document, such as instructions as to what should be photographed or video recorded (e.g., the person's face) and/or a phrase that is to be vocalized during an audio recording (e.g., phrase attesting to the person's identity and agreement to terms recited in the document and/or acknowledgment of the person's relationship (e.g. author) to the document).

The requesting device 100 can then communicate an authentication code generation request to the authentication server 140 to request generation of an authentication code for the document.

Figure 4:
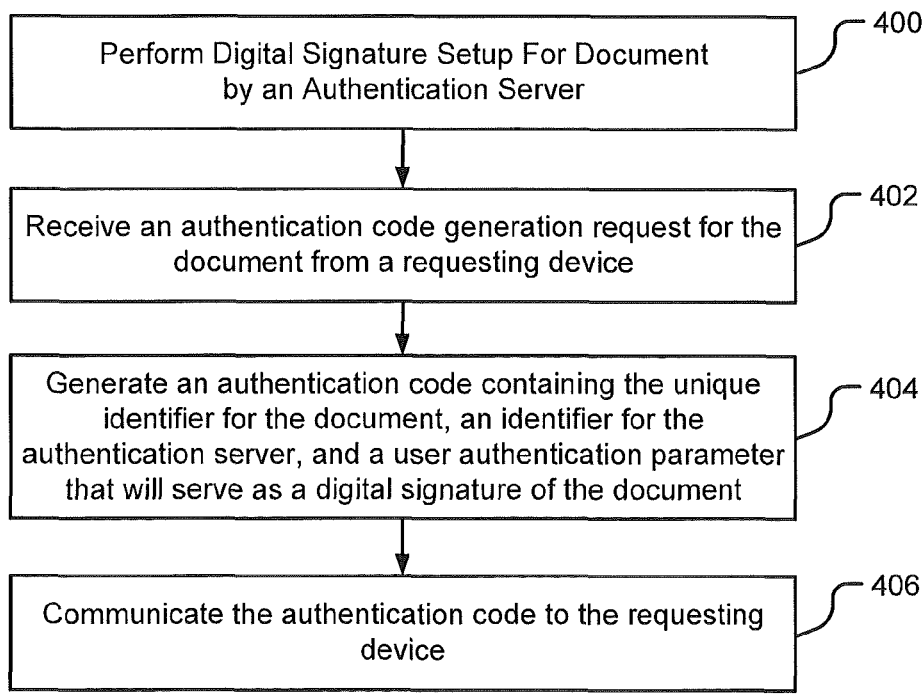
FIG. 4 illustrates example operations by an authentication server for setting up a digital signature for a document according to some embodiments of the present disclosure.

FIG. 4 illustrates example operations that can be performed (block 400) by the authentication server 140 to setup a digital signature for a document, including generating the authentication code for the document, according to some embodiments of the present disclosure. Referring to FIGS. 2 and 4, the authentication server 140 receives (block 402) the authentication code generation request from the requesting device 100, and responsively generates (block 404) an authentication code containing a unique identifier for the document, an identifier for the authentication server 140, and a user authentication parameter that will serve as a digital signature for the document. The authentication server 140 communicates the authentication code to the requesting device 100. Accordingly, the authentication code contains information that uniquely identifies the document and further identifies what characteristic of the user needs to be sensed/inputted to serve as a digital signature for the document.

The unique identifier for the document may be a universally unique identifier (UUID), which may be a nonce that is a unique global identifier for that document. The identifier for the authentication server 140 may be a network address (e.g., a Uniform Resource Locator, domain name, or any other mechanism for identifying a single computer or multiple computers on a network) for a document signing application on the authentication server 140. The user authentication parameter identifies what user characteristic needs to be obtained from the user to serve as the digital signature for the document. As explained above, the user authentication parameter may identify that the user needs to take a digital photograph, a digital video, and/or an audio recording, and may provide further instructions that are to be communicated to the person signing the document, such as instructions what should be photographed or video recorded (e.g., the person's face) and/or a phrase that is to be vocalized during an audio recording (e.g., phrase attesting to the person's identity and agreement to terms recited in the document).

The recorded phrase may be used by the system to prevent replay attacks (e.g., an attack in which a valid signature is maliciously or fraudulently repeated). Thus, for example, a recorded phrase from a known person may be compared to another previously recorded phrase by the same person to confirm that at least a threshold amount of difference exists therebetween. The system may thereby detect and prevent a recording of a person's earlier spoken signature phrase from improperly being reused to attempt to sign another document.

The authentication code may encode the unique identifier for the document, the identifier for the authentication server 140, and the user authentication parameter using optical encoding, which can be decoded from an optically captured representation of the authentication code. For example, the authentication code may be a Quick Response (QR) code, a bar code, and/or any other code that can encode information and is recognizable by devices such within image data from a camera or another image capture/scanning device.

In the example of FIG. 1, the requesting device 100 can display an electronic document 150 with a QR code 160 that has been inserted at a location which may have been specified by a user. The same or another user may operate a camera of the mobile terminal 110 to scan the QR code 160. The mobile terminal 110 decodes the QR code 160 to identify the unique identifier for the document, the identifier for the authentication server 140, and the user authentication parameter that will serve as a digital signature for the document.

The authentication code may alternately or additionally be printed on a physical (e.g., paper) document 152 or transmitted by a near field communication (NFC) transceiver (e.g., radio frequency identifier (RFID) transceiver, Bluetooth transceiver, etc.) that is associated with (e.g., attached to) the physical document 152 and/or associated with the requesting device 100 or another device. The authentication code may still alternately or additionally by communicated through a data network 130 and a radio access network (RAN) 120 to the mobile terminal 110.

The RAN 120 provides a radio communications interface with the mobile terminal 110 using, for example, operations in any of the following radio access technologies: GSM, code division multiple access (CDMA), wideband-CDMA, CDMA2000, Universal Mobile Telecommunications System (UMTS), Third Generation Partnership Project (3GPP) Long Term Evolution (LTE), Wi-Fi, and/or WiMAX. Other radio access technologies may alternatively or additionally be used in embodiments according to the disclosure.

Figure 5:
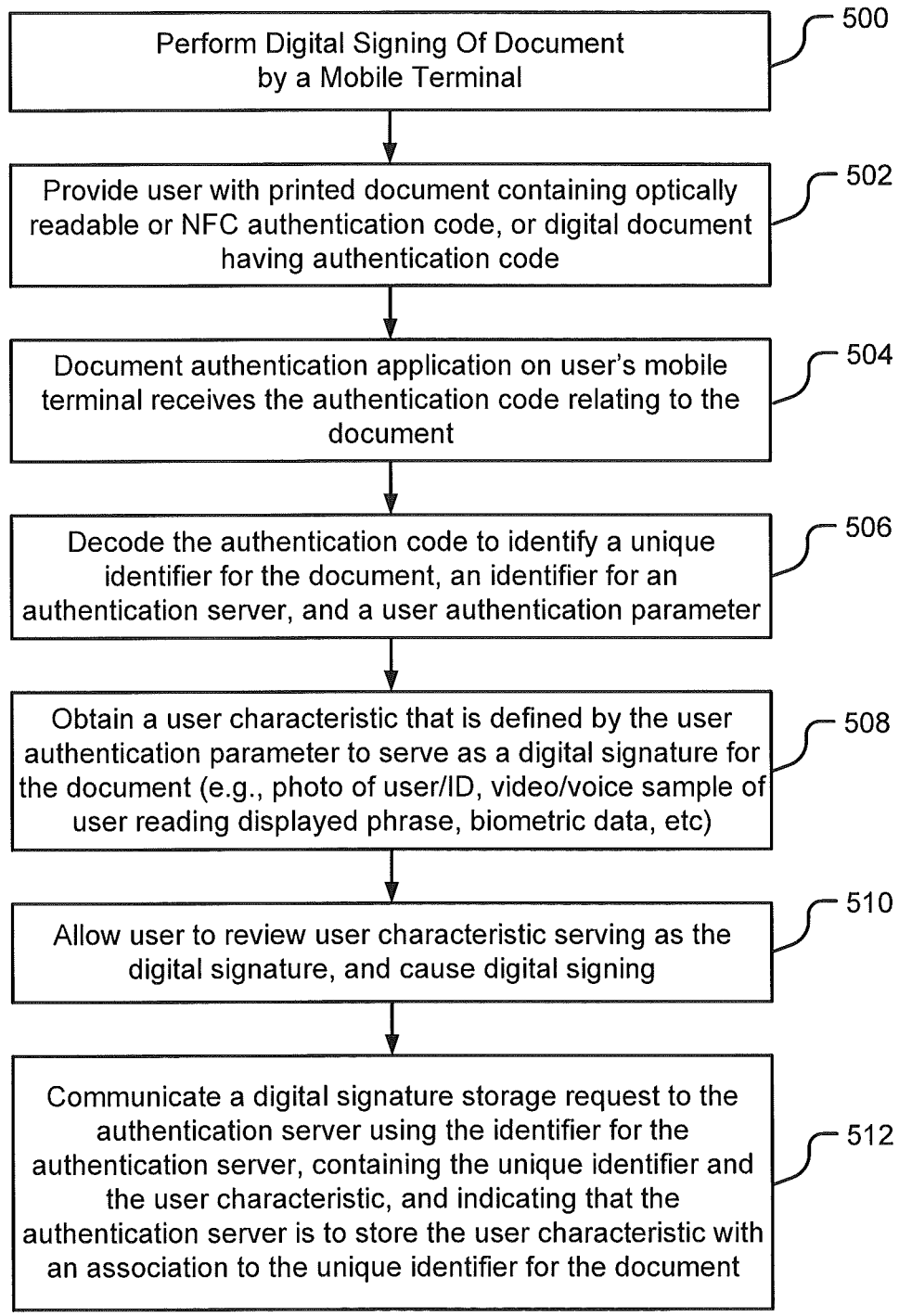
FIG. 5 illustrates example operations by a mobile terminal for performing digital signing of a document according to some embodiments of the present disclosure.

Referring again to FIG. 2, a user can operate the mobile terminal 110' to perform (block 500) digital signing of a document and communicate the digital signature to the authentication server for management, including storage (block 600) of the digital signature with an association to the document. FIG. 5 illustrates example operations by the mobile terminal 110' for obtaining the authentication code and performing (block 500 of FIGS. 2 and 5) digital signing of the document according to some embodiments of the present disclosure. The user is provided (block 502) with a printed document 152 having an optically readable authentication code or a near field communication transceiver, or is provided a digital document 150 that is associated with the authentication code.

The user runs a document signing and authentication application on the mobile terminal 110', which receives the authentication code relating to the document. As explained above, the document signing and authentication application may operate a camera of the mobile terminal 110' to optically scan the authentication code, communicate through a near field communication transceiver of the mobile terminal 110' to receive the authentication code, and/or communicate through another transceiver of the mobile terminal 110' to communicate with the requesting device 100 and/or the authentication server 140 to receive the authentication code.

The mobile terminal 110' decodes (block 506) the authentication code to identify the unique identifier for the document, the identifier for an authentication server, and the user authentication parameter. The mobile terminal 110' obtains (block 508) a user characteristic that is defined by the user authentication parameter to serve as a digital signature for the document. For example, the mobile terminal 110' may be controlled by the user characteristic to communicate instructions to the user to: 1) operate the mobile terminal 110' to capture a digital image (e.g., photograph) or digital video of the user's face and/or a defined portion of the document (e.g., the user's stylized script signature on a physical document) as the user characteristic which will serve as (at least a part of) the digital signature; 2) vocalize a displayed phrase while operating the mobile terminal 110 to capture digital video or digital recording of sound from the user as the user characteristic which will serve as (at least a part of) the digital signature; and/or 3) operate the mobile terminal 110 to obtain biometric data of the user, such as a fingerprint scan, hand palm scan, facial recognition, voice imprint, eye retina scan, etc, which will serve as (at least a part of) the digital signature.

The mobile terminal 110' may allow the user to review (block 510) the obtained user characteristic (e.g., to view a photograph/video recording of the user and/or hear an audio recording of the user), and cause digital signing of the document. The mobile terminal 110' communicates (block 512) a digital signature storage request to the authentication server 140 using the identifier for the authentication server, and containing the unique identifier in the obtained user characteristic. The digital signature storage request indicates to the authentication server 140 that the authentication server 140 is to store the user characteristic with an association (e.g., logical/programmatic association) to the unique identifier for the document.

Figure 6:
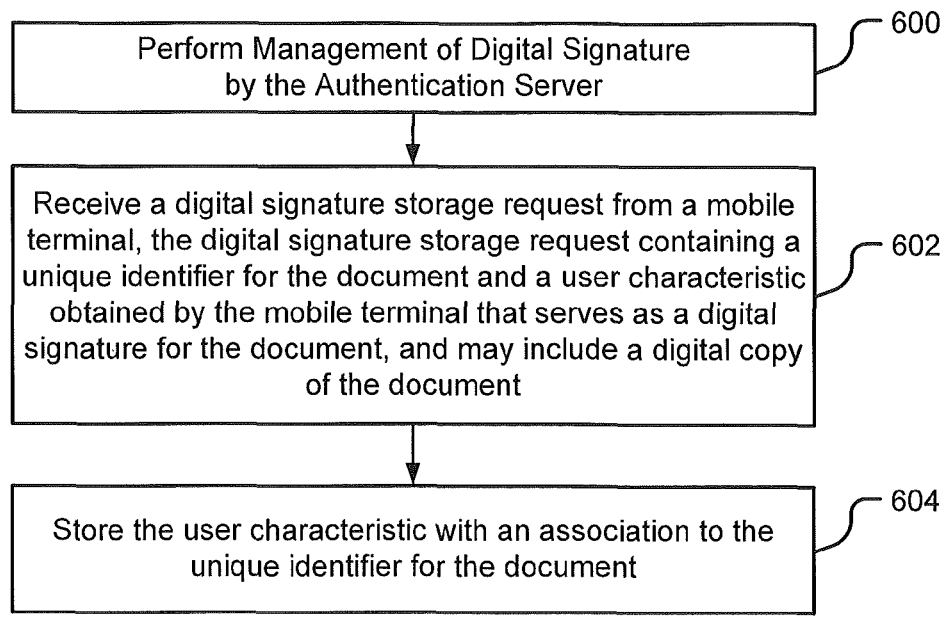
FIG. 6 illustrates example operations by an authentication server for managing a digital signature received from a mobile terminal according to some embodiments of the present disclosure.

FIG. 6 illustrates example operations by the authentication server 140 for managing (block 600 of FIGS. 2 and 6) a digital signature received from the mobile terminal 110' according to some embodiments of the present disclosure. The authentication server 140 receives (block 602) the digital signature storage request from the mobile terminal 110', where the digital signature storage request contains the unique identifier for the document and the user characteristic that was obtained by the mobile terminal 110' to serve as a digital signature for the document. The digital signature storage request may also include a digital copy of the document.

The authentication server 140 stores (block 604) the user characteristic with an association (e.g., logical/programmatic association) to the unique identifier for the document.

Referring again to FIG. 2, another user can subsequently operate the mobile terminal 110' or another mobile terminal 110" to initiate (block 700) review of the digital signature for a document, which causes the authentication server 140 to retrieve the stored digital signature for the document and provide the digital signature to the mobile terminal 110'/110" for review by the user. In the non-limiting example below, it is assumed that the user operates another mobile terminal 110" to review the digital signature.

Figure 7:
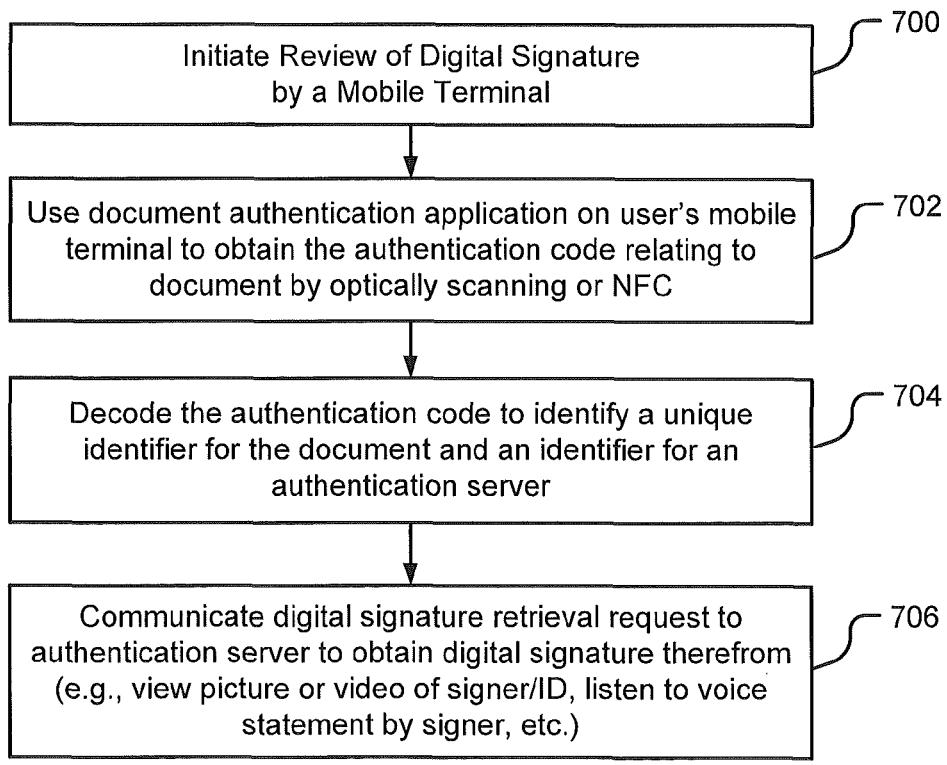
FIG. 7 illustrates example operations by a mobile terminal for initiating retrieval of a digital signature from an authentication server according to some embodiments of the present disclosure.

FIG. 7 illustrates further example operations by the mobile terminal 110" for initiating review (block 700) of the digital signature from the authentication server 140 according to some embodiments of the present disclosure. A user runs a document signing and authentication application on the mobile terminal 110" to obtain (block 702) the authentication code associated with the document. The application may operate the mobile terminal 110" to optically scan the authentication code, communicate through a near field communication transceiver of the mobile terminal 110" to receive the authentication code, and/or communicate through another transceiver of the mobile terminal 110" to communicate the authentication server 140 to receive the authentication code.

The mobile terminal 110" decodes (block 704) the authentication code to identify the unique identifier for the document and the identifier for the authentication server. The mobile terminal 110" communicates (block 706) a digital signature retrieval request to the authentication server 140 to retrieve the digital signature associated with the document.

Figure 8:
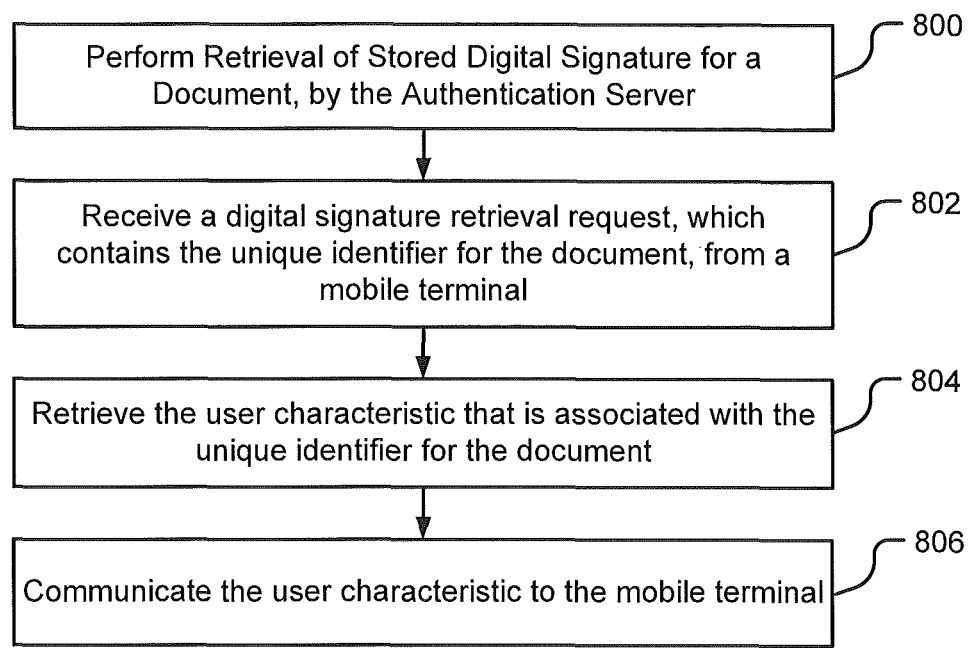
FIG. 8 illustrates example operations by an authentication server for retrieving a digital signature for communication to a mobile terminal according to some embodiments of the present disclosure.

FIG. 8 illustrates example operations by the authentication server 140 for performing retrieval (block 800) of the digital signature that has been stored with an association to the document, in accordance with some embodiments of the present disclosure. The authentication server 140 receives (block 802) the digital signature retrieval request, which contains the unique identifier for the document, from the mobile terminal 110". The authentication server 140 uses the unique identifier for the document as a pointer to retrieve (block 804) the user characteristic that was stored with an association to the document. The user characteristic is communicated (block 806) to the mobile terminal 110".

In the example of FIG. 1, a user can operate the mobile terminal 110 to optically scan the authentication code (e.g., QR code) for a document, or receive the authentication code through a near field communication transceiver or other communication interface. Mobile terminal 110 decodes the authentication code to identify the document 150/152 and the authentication server 140, and request the signature for the document from the authentication server 140. The authentication server 140 sends the signature that is associated with the document to the mobile terminal 110 for viewing, listening, or other display to the user. For example, the user may view a picture of the person who digitally signed the document, view a video and/or listen to an audio recording of a person attesting to the person's identity and agreement to terms recited in the document and/or acknowledgment of the person's relationship (e.g. author) to the document.

Figure 9:
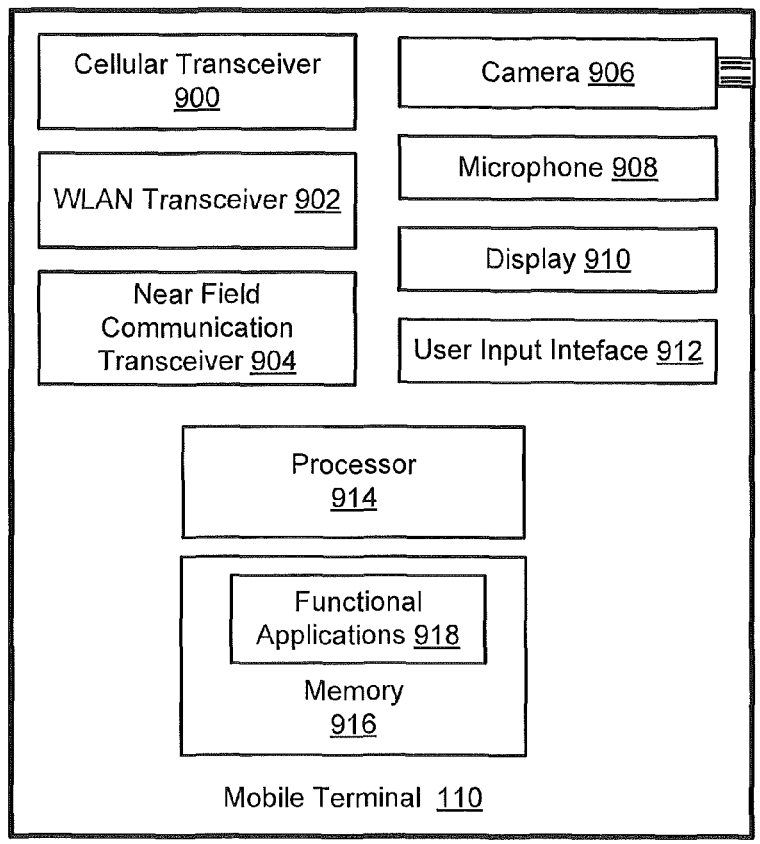
FIG. 9 is a block diagram of a mobile terminal according to some embodiments of the present disclosure.

FIG. 9 is a block diagram of the mobile terminal 110 according to some embodiments of the present disclosure. The mobile terminal 110 may include a computing/processing device such as a wireless phone, a personal digital assistant, a smart phone, a tablet computing device, and/or other portable computing device that can be used to communicated with authentication server 140.

The mobile terminal 110 includes a processor 914, a memory 916, and one or more communication transceivers, such as the illustrated cellular transceiver 900, WLAN transceiver 902, and/or near field communication transceiver 904. The cellular transceiver 900 and/or the WLAN transceiver 902 can be configured to communicate with the RAN 120. The mobile terminal 110 may further include other elements, such as a camera 906, a microphone 908, a display device 910, and a user input interface 912 (e.g., keyboard/keypad/touch sensitive interface).

The processor 914 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc) or distributed across one or more data networks. The processor 914 is configured to execute computer readable program code of functional applications 918 residing in the memory 916, described below as a computer readable storage medium, to perform at least some of the operations and methods described herein as being performed by a mobile terminal in accordance with one or more embodiments disclosed herein.

Figure 10:
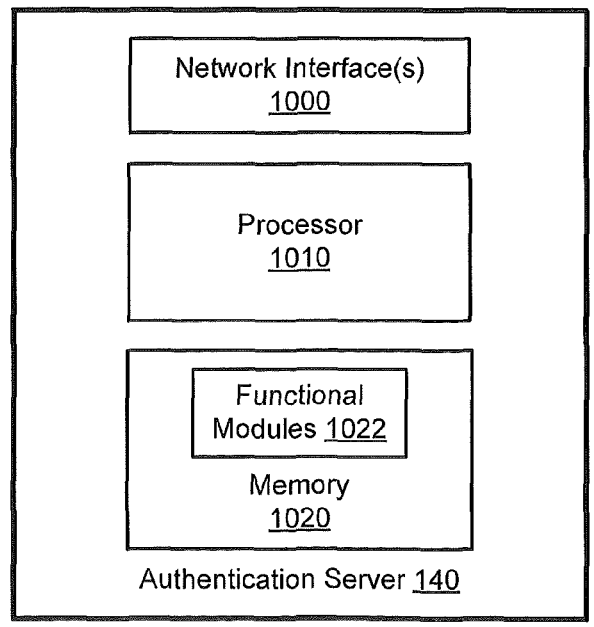
FIG. 10 is a block diagram of an authentication server according to some embodiments of the present disclosure.

FIG. 10 is a block diagram of the authentication server 140 according to some embodiments of the present disclosure. Functionality of the authentication server 140 may reside in a single server device or may be distributed across a plurality of networked server devices. The authentication server 140 includes a processor 1010, a memory 1020, and a network interface. The network interface can be configured to communicate with the requesting device 100 and the mobile terminal 110, such as through the network 130 and the RAN 120. The processor 1010 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc) or distributed across one or more data networks. The processor 1010 is configured to execute computer readable program code of functional applications 1022 residing in the memory 1020, described below as a computer readable storage medium, to perform at least some of the operations and methods described herein as being performed by an authentication server in accordance with one or more embodiments disclosed herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a buffered repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by an authentication server managing a digital signature for a document, the method comprising:
    receiving a digital signature storage request from a mobile terminal, the digital signature storage request containing a unique identifier for the document and a user characteristic obtained by the mobile terminal that serves as a digital signature for the document, wherein the user characteristic comprises a digital recording of sound from the user;
    determining whether at least a threshold amount of difference exists between the digital recording of sound received in the digital signature storage request to another digital recording of sound that was previously received in a digital signature storage request containing the unique identifier for the document;
    identifying the digital signature storage request as an improper replay attack based on determining that less than the threshold amount of difference exists;
    storing the user characteristic with an association to the unique identifier for the document in a memory responsive to the digital signature storage request and based on determining that more than the threshold amount of difference exists;
    receiving a digital signature retrieval request, which contains the unique identifier for the document, from another mobile terminal;
    retrieving from the memory the user characteristic that is associated with the unique identifier for the document; and
    communicating the user characteristic to the other mobile terminal responsive to the digital signature retrieval request.

2. The method of claim 1, wherein the user characteristic further comprises a digital image of the user.

3. The method of claim 1,
    wherein the digital signature retrieval request comprises an authentication code; and
    further comprising decoding the authentication code to identify the unique identifier for the document.

4. The method of claim 3, wherein the authentication code comprises a Quick Response (QR) code that encodes the unique identifier for the document, an identifier for the authentication server, and a user authentication parameter.

5. The method of claim 1, further comprising:
    receiving an authentication code generation request for the document from a requesting device;

generating an authentication code containing the unique identifier for the document, an identifier for the authentication server, and a user authentication parameter; and communicating the authentication code to the requesting device.

6. The method of claim 5, wherein the authentication code comprises a Quick Response (QR) code that encodes the unique identifier for the document, an identifier for the authentication server, and a user authentication parameter.

7. The method of claim 5, further comprising:
receiving a digital copy of the document; and
storing the digital copy of the document with an association to the unique identifier for the document.

8. A computer program product managing a digital signature for a document, the computer program product comprising:
a non-transitory computer readable storage medium having computer readable program code embodied in the medium, the computer readable program code comprising:
computer readable program code to receive a digital signature storage request from a mobile terminal, the digital signature storage request containing a unique identifier for the document and a user characteristic obtained by the mobile terminal that serves as a digital signature for the document, wherein the user characteristic comprises a digital recording of sound from the user;
computer readable program code to determine whether at least a threshold amount of difference exists between the digital recording of sound received in the digital signature storage request to another digital recording of sound that was previously received in a digital signature storage request containing the unique identifier for the document;
computer readable program code to identify the digital signature storage request as an improper replay attack based on determining that less than the threshold amount of difference exists;
computer readable program code to store the user characteristic with an association to the unique identifier for the document in a memory responsive to the digital signature storage request and based on determining that more than the threshold amount of difference exists;
computer readable program code to receive a digital signature retrieval request, which contains the unique identifier for the document, from another mobile terminal;
computer readable program code to retrieve from the memory the user characteristic that is associated with the unique identifier for the document; and
computer readable program code to communicate the user characteristic to the other mobile terminal responsive to the digital signature retrieval request.

9. The computer program product of claim 8,
wherein the digital signature retrieval request comprises a Quick Response (QR) code; and
further comprising computer readable program code to decode the QR code to identify the unique identifier for the document.

10. The computer program product of claim 8, further comprising:
computer readable program code to receive an authentication code generation request for the document from a requesting device;
computer readable program code to generate an authentication code containing the unique identifier for the document, an identifier for an authentication server that manages the digital signature for the document, and a user authentication parameter that defines a user characteristic serving as the digital signature for the document; and
computer readable program code to communicate the authentication code to the requesting device.

\* \* \* \* \*